US006403228B1

(12) United States Patent
Mack et al.

(10) Patent No.: US 6,403,228 B1
(45) Date of Patent: Jun. 11, 2002

(54) FUNCTIONAL ORGANYLORGANYLOXYSILANES ON A CARRIER IN CABLE COMPOUNDS

(75) Inventors: Helmut Mack, Rheinfelden; Ralf Laven, Schwoerstadt; Peter Jenkner, Rheinfelden; Roland Edelmann, Wehr; Dieter Barfurth; Albert-Johannes Frings, both of Rheinfelden; Burkhard Standke, Loerrach; Jaroslaw Monkiewicz; Michael Horn, both of Rheinfelden, all of (DE)

(73) Assignee: Degussa AG, Duesseldorf (DE)

( * ) Notice: Subject to any disclaimer, the term of this patent is extended or adjusted under 35 U.S.C. 154(b) by 0 days.

(21) Appl. No.: 09/604,273

(22) Filed: Jun. 26, 2000

(30) Foreign Application Priority Data

Jun. 25, 1999 (DE) .......................................... 199 29 021

(51) Int. Cl.[7] ............................ B32B 9/04; B32B 27/32

(52) U.S. Cl. ....................... 428/447; 428/500; 428/484; 524/506

(58) Field of Search ................................ 428/447, 484, 428/500; 524/506; 525/100

(56) References Cited

U.S. PATENT DOCUMENTS

| | | | | | |
|---|---|---|---|---|---|
| 3,983,070 | A | * | 9/1976 | Penneck | 260/38 |
| 4,826,899 | A | * | 5/1989 | Rees | 524/94 |
| 6,005,027 | A | * | 12/1999 | Guillet et al. | 523/209 |

FOREIGN PATENT DOCUMENTS

| | | | | | |
|---|---|---|---|---|---|
| DE | 2 237 354 | | | 2/1974 | |
| DE | 2 237 459 | | | 2/1974 | |
| DE | 4435 311 | A1 | | 4/1996 | |
| DE | 195 03 779 | C2 | | 8/1996 | |
| EP | 0 428 073 | A2 | | 5/1991 | |
| EP | 0158 057 | B1 | | 12/1992 | |
| GB | 1303432 | | * | 1/1973 | C08F/45/04 |
| WO | WO 96/26240 | | | 8/1996 | |
| WO | WO 97/07165 | | | 2/1997 | |

* cited by examiner

*Primary Examiner*—Robert Dawson
*Assistant Examiner*—Michael J Feely
(74) *Attorney, Agent, or Firm*—Oblon, Spivak, McClelland, Maier & Neustadt, P.C.

(57) ABSTRACT

The invention relates to the use of (1) a liquid functional organylorganyloxysilane bound to a carrier, or of a liquid (co)condensate derived from a functional organylorganyloxysilane and bound to a carrier for preparing cable compounds which comprise (2) a thermoplastic base polymer having polar functional groups and (3) a reinforcing or extending mineral filler.

30 Claims, No Drawings

FUNCTIONAL ORGANYLORGANYLOXYSILANES ON A CARRIER IN CABLE COMPOUNDS

BACKGROUND OF THE INVENTION

1. Field of the Invention

The invention relates to the use of functional organylorganyloxysilanes on a carrier in cable compounds which comprise certain thermoplastic base polymers, and also fillers. The invention further relates to the cable compounds as such, to cables with sheathings made from these cable compounds and a method of sheathing cable.

2. Discussion of the Background

Cable compounds is the term used for mixtures of substances which comprise a base polymer and also mineral (or inorganic) reinforcing, extending or flame-retardant fillers and are used to provide metallic conductors with an electrically insulating sheathing. It is known that adding functional organylorganyloxysilanes facilitates the dispersion of the filler in the base polymer and improves the adhesion between base polymer and filler. In this context organylorganyloxysilanes are silanes which carry, bonded via a carbon atom to the silicon atom, an organic radical which in turn contains a functional group. The easier dispersion and the improved adhesion could be attributable to hydrophobicization of the surface of the filler particles by the silane. Improved adhesion gives the cable sheathing better mechanical properties.

EP O 518 057 B1, for example, discloses liquid mixtures made from linear and cyclic siloxanes and, respectively, siloxane oligomers containing vinyl groups, and the use of these as crosslinking agents in cable compositions, e.g. for high-pressure polyethylene. However, liquid additives pose problems for the user since the usual equipment for weighing and feeding small amounts of additives is designed only for solids. Minor liquid components therefore have to be weighed out and fed manually. This generally increases costs and is an additional source of error.

A solution to this problem is to bind liquid functional organosilanes to highly adsorbent or highly absorbent solids, which can then be easily weighed out and fed as "dry liquids" using the usual equipment. For example, DE 195 03 779 A1 describes a combination of silica and transpolyoctenamer as a carrier for liquid rubber chemicals, including vinyl- and mercaptosilanes, and also sulfur silanes. DE 44 35 311 A1 describes materials called reinforcing additives, made from oligomeric and/or polymeric sulfur-containing organylorganyloxysilanes and from a carrier which is semi-activated, activated and/or highly activated carbon black. These are suitable for use in rubber mixtures or rubber compositions, and also plastics mixtures. In both of the texts mentioned, however, there is no mention of cable compounds. EP 0428 073 B 1 discloses a process in which (i) a base polymer, (ii) a spongy polymer or a swellable polymer in which a (meth)acryloxy-functional organosilane is present and (iii) a free-radical generator are mixed and the mixture melted and homogenized. This process, too, is not oriented toward the use of the homogenized mixtures for cable compounds. However, it is stated in WO 97/07165 that the solid mixtures described there, made from functional organosilanes and certain large-surface-area silicas having low surface energy, can be used, inter alla, for insulating wires and cables.

SUMMARY OF THE INVENTION

One of the subject matters of the present invention is a method of preparing cable compound comprising mixing (1) a liquid functional organylorganyloxysilane bound to a carrier, or of a liquid (co)condensate derived from a functional organylorganyloxysilane and bound to a carrier; (2) a thermoplastic base polymer which having polar functional groups; and (3) a reinforcing or extending mineral filler.

Another subject matter of the invention is cable compounds which comprise (1) a liquid functional organylorganyloxysilane bound to a carrier, or a liquid (co)condensate derived from a functional organylorganyloxysilane and bound to a carrier, (2) a thermoplastic base polymer having polar functional groups and (3) a reinforcing, extending or flame-retardant mineral filler.

A further subject matter of the invention is cables whose metallic conductors have been sheathed by a cable compound of this type.

A further subject matter of the invention is a method of sheathing cable comprising applying a surface layer of cable compound on the surface of a cable.

DETAILED DESCRIPTION OF THE PREFERRED EMBODIMENTS

Functional Organylorganyloxysilanes:

For the purposes of the invention, functional organylorganyloxysilanes comprise, bonded via a carbon atom to a silicon atom, at least one organic radical (organyl radical), such as a straight-chain or branched alkylene radical having from 2 to 6 carbon atoms and carrying at least one functional group. The functional group may, for example, be a hydroxyl, nitrile, carbonyl, carboxyl, acyl, acyloxy, carboalkoxy, mercapto, sulfane ($X_x$) or epoxy group or an amino group, if desired substituted by one or two hydrocarbon radicals having from 1 to 6 carbon atoms, or else a halogen atom, in particular a chlorine atom, or an olefinic double bond or a C—C triple bond. The organic radical may also contain two or more identical or different functional groups, e.g. two amino groups or an acyl radical having an olefinic double bond, for example the (meth)acryloxy radical. The functional organylorganyloxysilanes secondly contain at least one hydrolyzable radical, preferably three hydrolyzable radicals, e.g. one or more alkoxy or alkoxyalkoxy radicals having in each case from 1 to 6 carbon atoms. The functional organylorganyloxysilanes may moreover contain one or two other nonfunctional and nonhydrolyzable radicals, e.g. a hydrocarbon radical having up to 8 carbon atoms, for example methyl, propyl or n-hexyl.

Examples of suitable functional organylorganyloxysilanes are vinyltrimethoxysilane, vinyltriethoxysilane, vinyltris(2-methoxyethoxy)silane, 3-mercaptopropyltrimethoxysilane, 3-glycidyloxypropyltrimethoxysilane, 3-glycidyloxypropyltriethoxysilane, 3-methacryloxypropyltrimethoxysilane, and 3-ethacryloxypropyltris(2-methoxyethoxy)silane. Preferred functional organylorganyloxysilanes are aminoorganylorganyloxysilanes, if desired N-substituted by one or two alkyl radicals each having from 1 to 6 carbon atoms, since the sheathings made from the corresponding compounds have excellent mechanical properties (such as tensile strength, elongation at break, ultimate tensile strength and modulus of elasticity) and electrical properties (such a electrical dissipation factor and dielectric constant). Among the suitable aminoorganylorganyloxysilanes mention may be made, for example, of 3-aminopropyltrimethoxysilane, 3-aminopropyltriethoxysilane, 3-aminopropylmethyldiethoxysilane, N-aminoethyl-3-aminopropyltrimethoxysilane, triamino-functional propyltrimethoxysilane (N-trimethoxysilylpropyldiethylenetriamine, also termed DYNASYLAN® TRIAMO) and (N'-aminoethyl)-N-aminoethyl-3-aminopropylsilane.

Instead of a functional organylorganyloxysilane a mixture made from one or more of these substances may be used. According to the invention use may also be successfully made of (co)condensates of the functional organylorganyloxysilanes having weight-average molecular weights of up to about 10,000. These are understood to be condensates (or oligomers) of the functional organylorganyloxysilanes and, respectively, cocondensates of these substances with other, nonfunctional organylorganyloxysilanes or with organyloxysilanes. Among these mention may be made, for example, of methyltrimethoxysilane, methyltriethoxysilane, n-propyltrimethoxysilane, n-propyltriethoxysilane, isobutyltrimethoxysilane, isobutyltriethoxysilane, octyltriethoxysilane, hexadecyltrimethoxysilane and tetraethoxysilane. The (co)condensates are prepared, for example, in a known manner by hydrolysis and, respectively, cohydrolysis of the silanes with limited amounts of water, followed by condensation of the silanols. In the cocondensates the proportion of the (amino)functional organylorganyloxysilanes should be at least 10% by weight, advantageously at least 50% by weight.

Instead of a cocondensate it is also possible to use the functional organylorganyloxysilane together with a nonfunctional organylorganyloxysilane or organyloxysilane in the quantitative proportions given for the cocondensates.

The simplified term functional organylorganyloxysilanes when used below always means substances liquid at room temperature, and the (co)condensates mentioned are included here.

Carriers for the Functional Organylorganyloxysilanes:

Suitable carriers are a wide variety of materials known per se as carriers. Individual mention may be made of:

Pyrogenic silica, which is prepared on an industrial scale by a continuous hydrolysis of silicon tetrachloride in a hydrogen/oxygen flame. This evaporates the silicon tetrachloride, which then reacts spontaneously and quantitatively within the flame with the water derived from the hydrogen/oxygen reaction. Pyrogenic silica is an amorphous modification of silicon dioxide, taking the form of a bluish loosely packed powder. The particle size is a few nanometers, and the specific surface area is therefore large, generally from 50 to 600 $m^2/g$. The particles are not porous, and the functional organylorganyloxysilanes are taken up solely by adsorption.

Precipitation silicas are generally prepared from sodium water glass solutions by neutralizing with inorganic acids under controlled conditions. Removal from the liquid phase, rinsing and drying gives the crude product, which is finely ground, e.g. in steamjet mills. Precipitation silica too, is an amorphous silicon dioxide, but its specific surface area is generally smaller, mostly from 50 to 150 $m^2/g$. Unlike pyrogenic silica precipitation silica has some porosity (about 10%). The functional organylorganyloxysilanes are therefore taken up both by adsorption on the surface and by absorption in the pores.

Calcium silicate is prepared industrially by melting quartz or kieselguhr together with calcium carbonate or, respectively, calcium oxide, or by precipitating aqueous sodium metasilicate solutions with water-soluble calcium compounds. The carefully dried product is porous and can take up to five times its weight of water or oils.

Porous polyethylene is prepared by specific polymerization techniques and processes and supplied by, for example AKZO and DSM in industrial quantities. The particle sizes are from 3 to <1 mm and the porosity is above 50%, and the products can therefore absorb large amounts of functional organylorganyloxysilanes without losing their free-flowing properties.

Particularly suitable waxes are polyolefin waxes based on LDPE (branched, with long side chains). The melting point and solidifying point are generally between 90 and 120° C. The waxes are easily mixed in the low-viscosity melt with the functional organylorganyloxysilanes. The hardness of the solidified mixture is sufficient for it to be pelletized.

The various commercially available forms of carbon black are suitable, for example for producing black cable sheathings. Carbon black is used mainly in conjunction with sulfur-containing silanes.

Preparation of “Dry Liquids” from Functional Organylorganyloxysilanes and Carriers:

The methods below are some of those available for preparing the “dry liquids”:

Mineral carriers or porous polymers are preheated, e.g., in a heating cabinet at 60° C., and placed in a cylindrical container which has been flushed with, and filled with, dry nitrogen. The functional organylorganyloxysilane is then added and the container is placed into a roller apparatus which rotates it for about 30 min. By then the carrier and the liquid functional organylorganyloxysilane physically and not chemically bound to each other have formed a free-flowing granular material with a dry surface, which is usefully stored under nitrogen in nontranslucent containers.

Another way is to place the heated carrier into a mixer flushed with, and filled with, dry nitrogen, for example a LÖDIGE plowshare mixer or a HENSCHEL propeller mixer. The mixing element is started up and the functional organylorganyloxysilane is sprayed in via a nozzle once the maximum mixing rate has been reached. After the addition has finished homogenization continues for about 30 min and the product is then drawn off, for example via pneumatic conveying operated using dry nitrogen, into nitrogen-filled nontranslucent containers.

Wax/polyethylene wax in pelletized form with a melting point of from 90 to 120° C. is melted little by little in a treatable vessel with stirrer, reflux condenser and apparatus for adding liquids, and held in the molten state. During the entire preparation process dry nitrogen is passed through the apparatus. The apparatus for adding liquids is used to add the liquid functional organylorganyloxysilane gradually into the melt, and this is mixed with the wax by intensive stirring. The melt is then left to solidify in molds and the solidified product is pelletized. Another way is to allow the melt to drop onto a cooled molding belt, upon which it solidifies in the form of pastilles which are easy to use.

Base Polymers:

An important feature of the invention is that the base polymer of the cable compounds is thermoplastic and has polar groups. Base polymers of this type give, for example, improved fire performance (i.e. lower flammability and smoke density) and increase the capability to take up filler. Examples of polar groups are hydroxyl, nitrile, carbonyl, carboxyl, acyl, acyloxy, carboalkoxy and amino groups, and also halogen atoms, in particular chlorine atoms. Nonpolar functions are olefinic double bonds or C—C triple bonds. Suitable polymers besides polyvinyl chloride are copolymers made from one or more olefins and one or more comonomers which contain polar groups, e.g. vinyl acetate, vinyl propionate, (meth)acrylic acid, methyl (meth)acrylate, ethyl (meth)acrylate, butyl (meth)acrylate or acrylonitrile. The amount of the polar groups generally found in the copolymers is from 0.1 to 50 mol %, preferably from 5 to 30 mol %, based on the polyolefin building blocks. Ethylene-vinyl acetate copolymers are highly suitable base polymers. An example of a suitable commercially available copolymer comprises 19 mol % of vinyl acetate and 81 mol % of ethylene building blocks.

Fillers:

The fillers are of mineral (or inorganic) type and may be reinforcing fillers or merely extending fillers. At least on their surfaces, they carry groups which react with the organyloxy groups of the functional organylorganyloxysilane. The result of this is that the silicon atom to which the functional organyl radical has been bonded becomes chemically fixed on the surface. Groups of this type on the surface of the filler are in particular hydroxyl groups. Preferred fillers are correspondingly metal hydroxides having a stoichiometric proportion or, in their various stages of dehydration, having a substoichiometric proportion of hydroxyl groups, extending as far as oxides in which the number of residual hydroxyl groups is relatively small but these can be detected by DRIFT IR spectroscopy. Examples of suitable fillers are aluminum trihydroxide (ATH), aluminum oxide hydrate (AlOOH), magnesium hydroxide, brucite, huntite, hydromagnesite, mica and montmorillonite.

Quantitative Proportions of the Various Components in the Cable Compounds:

The quantitative proportions of functional organylorganyloxysilane and carrier may vary within wide limits, depending on the type of carrier and its ability to take up materials, and on the particular silane used. The amounts of the desired functional organylorganyloxysilane which a certain carrier can take up without losing its free-flowing properties can easily be determined by exploratory experiments. It is usual to use from 20 to 80% by weight of functional organylorganyloxysilane, based on the carrier.

The proportion of the filler depends on its type, on the particular base polymer used and on the stresses to which the compounds are exposed when used as specified. The amount of filler used is generally from 5 to 80% by weight, advantageously from 50 to 70% by weight, based on the compound.

The amount of the functional organylorganyloxysilane must be adjusted so that the surface of the filler becomes adequately covered and hydrophobicized. Relatively small amounts are sufficient for this. Based on the filler, from 0.1 to 5% by weight of functional organylorganyloxysilane, and usefully from 0.5 to 2% by weight, is generally used.

For all of the quantitative proportions mentioned it is true to say that the ideal values for a given application and given components can easily be determined by exploratory experiments.

Other Components in the Cable Compounds:

The novel cable compounds may comprise the usual amounts of the additives usual for similar compounds. Examples of these additives which may be mentioned are UV stabilizers, heat stabilizers, lubricants, extrusion aids and peroxides. Their proportion in the compound is generally less than 5% by weight.

Preparation of the Cable Compounds from Base Polymer. Filler and "Dry Liquid":

The cable compounds are prepared by mixing the components in the melt, usefully with exclusion of moisture. The usual treatable homogenizing apparatus is suitable for this, for example a kneader or, advantageously for continuous operation, an extruder, in particular a twin-screw extruder. The stated quantitative proportion of each of the components is introduced continuously, either on its own or in a premix, into the extruder, which has been heated to a temperature above the melting point of the base polymer. It is useful to allow the temperature to rise toward the end of the screw in order to establish a lower viscosity and thus allow intimate mixing. The extrudates may remain liquid while they are introduced into equipment for sheathing electrical conductors, or they may be allowed to solidify so that they can then be comminuted to particle sizes appropriate to their application.

The examples below are intended to describe the invention further but not to restrict its scope of application as set out in the claims.

EXAMPLES

Example 1

"Dry Liquid" Made from 3-aminopropyltriethoxysilane and Pyrogenic Silica 500 g of pyrogenic silica (AEROSOL®200) are placed in an approximately 9 liter HENSCHEL FM/A 10 laboratory mixer and the mixer is set in motion. The rotation rate of the mixing element is set to 400 rpm. The feed system is first used to replace the air with dry nitrogen. The pyrogenic silica is then brought to 50° C. using the jacket of the mixing vessel and a thermostat and heating oil. After about 30 min a total of 1500 g of 3-aminopropyltriethoxysilane (DYNASYLAN®) AMEO from DEGUSSA-HÜLS AG) is metered in via the feed system of the mixer at 50 g/min. After the addition has ended the supply of heat is stopped and the material in the mixer is mixed for a further 30 min. and then this "dry liquid" is removed from the mixer and drawn off under nitrogen into nontranslucent containers.

Example 2

"Dry Liquid" Made from Precipitation Silica and N-aminoethyl-3-aminopropyltrimethoxysilane 800 g of precipitation silica (ULTRASIL® VN3 from DEGUSSA-HÜLS AG) are placed in a cylindrical vessel of external diameter 20 cm and length 35 cm. The charge is covered with dry nitrogen and the vessel sealed. The reaction mixture is heated in a heating cabinet at 60° C. for 1 h. The heated vessel is opened and the contents mixed with 1200 g of N-aminoethyl-3-aminopropyltrimethoxysilane (DYNASYLAN®) DAMO from DEGUSSA-HÜLS AG). The vessel is resealed and then rotated for 30 min on a roller system. The resultant product has a dry surface and is free flowing. It is drawn off under dry nitrogen into nontranslucent containers.

Example 3

Determination of the Extractable Proportion of a "Dry Liquid"

30 g of each of the "dry liquids" are placed into the extraction capsule of a 100 ml Soxhlet extraction apparatus and 180 ml of dry, analytically pure methyl ethyl ketone are placed into the flask. The methyl ethyl ketone is heated to boiling and the "dry liquid" extracted for 2 hours. The extraction capsule with the extraction residue is dried and weighed. "Extractable silane" is calculated from the weight loss. The results are given in Table 1 below.

TABLE 1

| "Dry liquid" | Silane content in "dry liquid" [%] | [g/30 g] | Extraction residue [g/30 g] | "Extractable silane" [g/20 g] | [%] |
|---|---|---|---|---|---|
| Example 1 | 75 | 22.5 | 7.9 | 22.1 | 98.2 |
| Example 2 | 60 | 18.0 | 12.8 | 17.2 | 95.6 |

The table shows that the binding of the silane to the carrier is practically completely reversible.

Example 4

Processing of "Dry Liquids" to Give Cable Compounds and Comparison of Liquid Silane with Silane on Carrier The following components were used to prepare halogen-free cable compounds with flame-retardant properties (halogen-free flame-retardant [HFFR] compounds):

| Component | Amount |
|---|---|
| Aluminum hydroxide (ATM) | 160 parts |
| Ethylene-vinyl acetate copolymer (EVA, 19% VA) | 100 parts |
| IRGANOX ® 1010 (UV stabilizer) | 1 part |

Functional organylorganyloxysilanes:

(1) 3-Aminopropyltriethoxysilane (DYNASYLAN® AMEO)

(2) N-Ethylamino-3-aminopropyltrimethoxysilane (DYNASYLAN® DAMO)

(3) DYNASYLAN® 1291 (mixture made from 3-aminopropyl-trimethoxysilane and methyltriethoxysilane in a weight ratio of 2:1)

| | |
|---|---|
| as liquid | as in table |
| as "dry liquid" with precipitation silica (ULTRASIL ®) VN3) as carrier | as in table |

Compounding is carried out in a ZE 25 twin-screw extruder from Berstorff, Hanover, Germany (L/D ratio=33, screw diameter 25 mm, 125 rpm). The base polymer EVA is first dried for an hour in a circulating-air drying cabinet at 60° C. If liquid silane is used this is applied to the dried EVA and is absorbed into this within an hour. If the silane is used as "dry liquid" this is mixed with the EVA. The stabilizer is mixed with the ATH. EVA/silane on the one hand and ATH/stabilizer on the other hand are fed gravimetrically into the extruder. The extruder temperature rises from 135 to 170° C. between the feed and the end of the screw. The residence time is not more than 150 sec. Test samples are produced from the strips extruded.

The following values were determined on the test samples to the standards below:

| | | |
|---|---|---|
| Tensile strength | [N/mm], | determined to EN ISO 527 |
| Elongation at break | [%] | determined to EN ISO 527 |
| Ultimate tensile strength | [N/mm], | determined to EN ISO 527 |
| Water take-up | [mg/cm$^2$] | determined by weighing |

Table 2 below shows the quantitative proportions and the results obtained. The parts are parts by weight.

TABLE 2

| Silane | Liq. [Pts.] | "Dry liquid" Silane content [%] | "Dry liquid" Amount [Pts] | Test results: Tensile strength [N/mm] | Elongation at break [%] | Ultimate tensile strength [N/mm] | Water take-up [mg/cm$^2$] |
|---|---|---|---|---|---|---|---|
| (1) | 1.5 | — | — | 16.3 | 210 | 10.2 | 4.02 |
| (1) | — | 75 | 2 | 16.5 | 215 | 10.0 | 3.96 |
| (2) | 1.5 | — | — | 17.3 | 220 | 10.9 | 3.85 |
| (2) | — | 60 | 2.5 | 17.7 | 215 | 10.5 | 3.81 |
| (3) | 1.5 | — | — | 16.6 | 226 | 12.4 | 3.40 |
| (3) | — | 74 | 2 | 16.8 | 222 | 12.7 | 3.34 |

The values obtained with liquid silane and the values with silane on carrier are comparable. The advantage of the easier handling of the "dry liquids" is therefore not obtained at the cost of poorer properties in the cable compounds.

Obviously, numerous modifications and variations of the present invention are possible in light of the above teachings. It is therefore to be understood that within the scope of the appended claims, the invention may be practiced otherwise than as specifically described herein.

This application is based on German patent application DE 19929021.0 filed in the German Patent Office on Jun. 25, 1999, the entire contents of which are hereby incorporated by reference.

What is claimed is:

1. A method of preparing cable compound comprising mixing (1) a liquid functional organylorganyloxysilane bound to a wax, or of a liquid (co)condensate derived from a functional organylorganyloxysilane and bound to a wax with (2) a thermoplastic base polymer having polar functional groups and (3) a reinforcing or extending mineral filler.

2. The method of claim 1, wherein said wax is an LDPE-based polyolefin wax, an ethylene vinyl acetate copolymer or a mixture thereof.

3. The method of claim 1, wherein said functional organylorganyloxysilane is an aminoorganylorganyloxysilane.

4. The method of claim 3, wherein said aminoorganylorganyloxysilane is N-substituted by one or two alkyl radicals each having from 1 to 6 carbon atoms.

5. The method of claim 4, wherein said functional organylorganyloxysilane is used in the form of a (co)condensate with nonfunctional organylorganyloxysilanes with a weight-average molecular weight of up to about 10,000.

6. The method of claim 1, wherein said base polymer is polyvinyl chloride or a copolymer made from one or more olefins and one or more comonomers which contain polar groups.

7. The method of claim 1, wherein said mineral filler is a metal hydroxide having a stoichiometric or substoichiometric proportion of hydroxyl groups or a metal oxide with residual hydroxyl groups.

8. The method of claim 1, wherein said organylorganyloxysilane is selected from the group consisting of vinyltrimethoxysilane, vinyltriethoxysilane, vinyltris(2-methoxyethoxy)silane, 3-mercaptopropyltrimethoxysilane, 3-glycidyloxypropyltrimethoxysilane, 3-glycidyloxypropyltriethoxysilane, 3-methacryloxypropyltriethoxysilane, 3-methacryloxypropyltrimethoxysilane, 3-ethacryloxypropyltris(2-methoxyethoxy)silane and a mixture thereof.

9. The method of claim 1, wherein said organylorganyloxysilane is selected from the group consisting of 3-aminopropyltrimethoxysilane, 3-aminopropyltriethoxysilane, 3-aminopropylmethyldiethoxysilane, N-aminoethyl-3-aminopropyltrimethoxysilane, triamino-functional propyltrimethoxysilane, (N-trimethoxysilyl) propyldiethylenetriamine, (N'-aminoethyl)-N-aminoethyl-3-aminopropylsilane and a mixture thereof.

10. A cable compound which comprises (1) a liquid functional organylorganyloxysilane bound to a wax, or a liquid (co)condensate derived from a functional organylorganyloxysilane and bound to a wax, (2) a thermoplastic base polymer having polar functional groups and (3) a reinforcing or extending mineral filler.

11. A cable whose metallic conductor has been sheathed by a cable compound as claimed in claim 10.

12. A method of sheathing a cable comprising depositing on the surface of a cable, the cable compound of claim 10.

13. A method of preparing cable compound comprising mixing (1) a liquid functional organylorganyloxysilane physically and not chemically bound to a carrier, or of a liquid (co)condensate derived from a functional organylorganyloxysilane and physically and not chemically bound to a carrier with (2) a thermoplastic base polymer made from one or more olefins having polar functional groups and (3) a reinforcing or extending mineral filler.

14. The method of claim 13, wherein said carrier is pyrogenic silica.

15. The method of claim 13, wherein said carrier is precipitated silica.

16. The method of claim 13, wherein said carrier is calcium silicate.

17. The method of claim 13, wherein said carrier is a wax.

18. The method of claim 17, wherein said wax is an LDPE-based polyolefin wax, an ethylene-vinyl acetate copolymer or a mixture thereof.

19. The method of claim 13, wherein said functional organylorganyloxysilane is an aminoorganylorganyloxysilane.

20. The method of claim 19, wherein said aminoorganylorganyloxysilane is N-substituted by one or two alkyl radicals each having 1 to 6 carbon atoms.

21. The method of claim 20, wherein said functional organylorganyloxysilane is used in the form of a (co) condensate with nonfunctional organylorganyloxysilanes with a weight-average molecular weight of up to about 10,000.

22. The method of claim 13, wherein said base polymer is polyvinyl chloride or a copolymer made from one or more olefins and one or more comonomers which contain polar groups.

23. The method of claim 13, wherein said mineral filler is a metal hydroxide having a stoichiometric or substoichiometric proportion of hydroxyl groups or a metal oxide with residual hydroxyl groups.

24. The method of claim 13, wherein said organylorganyloxysilane is selected from the group consisting of vinyltrimethoxysilane, vinyltriethoxysilane, vinyltris(2-methoxy)silane, 3-mercaptopropyltrimethoxysilane, 3-glycidyloxypropyltrimethoxysilane, 3-glycidyloxypropyltriethoxysilane, 3-methacryloxypropyltriethoxysilane, 3-methacryloxypropyltrimethoxysilane, 3-ethacryloxypropyltris(2-methoxyethoxy)silane and a mixture thereof.

25. The method of claim 13, wherein said organylorganyloxysilane is selected from the group consisting of 3-aminopropyltrimethoxysilane, 3-aminopropyltriethoxysilane, 3-aminopropylmethyldiethoxysilane, N-aminoethyl-3-aminopropyltrimethoxysilane, triamino-functional propyltrimethoxysilane, (N-trimethoxysilyl) propyldiethylenetriamine, (N'-aminoethyl)-N-aminoethyl-3-aminopropylsilane and a mixture thereof.

26. A cable compound which comprises (1) a liquid functional organylorganyloxysilane physically and not chemically bound to a carrier, or a liquid (co)condensate derived from a functional organylorganyloxysilane and physically and not chemically bound to a carrier, (2) a thermoplastic base polymer made from one or more olefins having polar functional groups and (3) a reinforcing or extending mineral filler.

27. A cable whose metallic conductor has been sheathed by a cable compound as claimed in claim 26.

28. A method of sheathing a cable comprising depositing on the surface of a cable, the cable compound of claim 26.

29. A cable compound produced by melt mixing a mixture which comprises (1) a liquid functional organylorganyloxysilane physically and not chemically bound to a carrier, or a liquid (co)condensate derived from a functional organylorganyloxysilane and physically and not chemically bound to a carrier, (2) a thermoplastic base polymer made from one or more olefins having polar functional groups and (3) a reinforcing or extending mineral filler.

30. A cable compound produced by melt mixing a mixture which comprises (1) a liquid functional organylorganyloxysilane bound to a wax, or a liquid (co)condensate derived from a functional organylorganyloxysilane and bound to a wax, (2) a thermoplastic base polymer having polar functional groups and (3) a reinforcing or extending mineral filler.

* * * * *